United States Patent [19]

Thompson

[11] Patent Number: 4,958,503

[45] Date of Patent: Sep. 25, 1990

[54] GAS DETECTOR AND METHOD FOR REFRIGERATION SYSTEMS

[76] Inventor: Mark S. Thompson, 1923 Jefferson, Redwood City, Calif. 94061

[21] Appl. No.: 400,473

[22] Filed: Aug. 30, 1989

[51] Int. Cl.[5] .................................... G01F 13/00

[52] U.S. Cl. .................................... 62/129; 62/77; 62/292; 73/861.41

[58] Field of Search .................... 62/125, 129, 149, 77, 62/85, 292; 417/63; 73/861, 861.41; 340/606, 608, 609

[56] References Cited

U.S. PATENT DOCUMENTS

| | | | |
|---|---|---|---|
| 1,639,986 | 8/1927 | Conner . | |
| 2,074,950 | 3/1937 | Wallace et al. | 73/861 |
| 2,202,010 | 5/1940 | Kondolf | 62/129 X |
| 2,594,668 | 4/1952 | Mannal | 73/861.41 |
| 3,996,765 | 12/1976 | Mullins | 62/292 |
| 4,470,265 | 9/1984 | Correia | 62/292 X |
| 4,597,716 | 7/1986 | Evenson | 417/181 |

*Primary Examiner*—Harry B. Tanner

*Attorney, Agent, or Firm*—Flehr, Hohbach, Test, Albritton, & Herbert

[57] ABSTRACT

Device and method for detecting the presence of gas in refrigeration systems and other evacuated systems. The exhaust from a vacuum pump connected to the system is passed through a gas detector having a reservoir of liquid in which bubbling can be observed. The exhaust is normally discharged through a discharge opening in the detector. The opening is blocked with the hand to divert the exhaust from the vacuum pump into the liquid to produce bubbling in the liquid in the event that any gas is present in the exhaust.

8 Claims, 1 Drawing Sheet

GAS DETECTOR AND METHOD FOR REFRIGERATION SYSTEMS

This invention pertains generally to refrigeration systems and, more particularly, to a device and method for detecting the presence of gas in refrigeration systems and other evacuated systems.

Refrigeration systems are generally evacuated or pumped down to a very low pressure (e.g. 200 microns or less) before being charged with Freon or another refrigerant. Before the refrigerant is introduced, it is important to make certain that all gas contaminants have been removed and that the system is not leaking. Heretofore, it has generally been necessary to use relatively expensive gauges or other instrumentation to determine when the contaminants have been removed and the desired pressure level has been reached.

It is in general an object of the invention to provide a new and improved device and method for detecting the presence of gas in refrigeration systems and other evacuated systems.

Another object of the invention is to provide a detector and method of the above character which are inexpensive and easy to use.

These and other objects are achieved in accordance with the invention by passing the exhaust from a vacuum pump connected to the system to be evacuated through a gas detector having a discharge opening through which the exhaust is normally discharged and a reservoir of liquid in which bubbling can be observed. The discharge opening is blocked with the hand to divert the exhaust from the vacuum pump into the liquid to produce bubbling in the liquid in the event that any gas is present.

Figure 1:
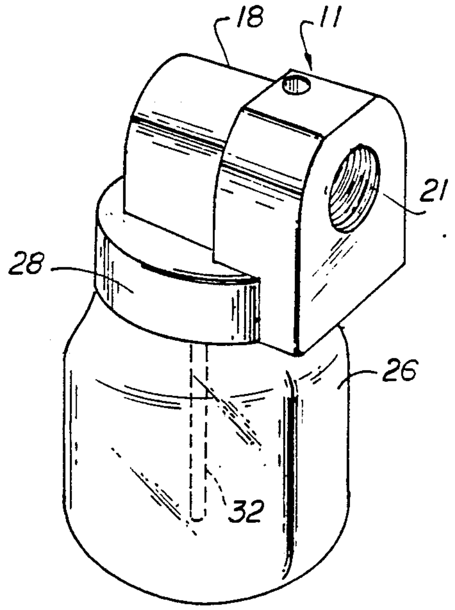
FIG. 1 is an isometric view of one embodiment of a gas detector according to the invention.
Figure 2:
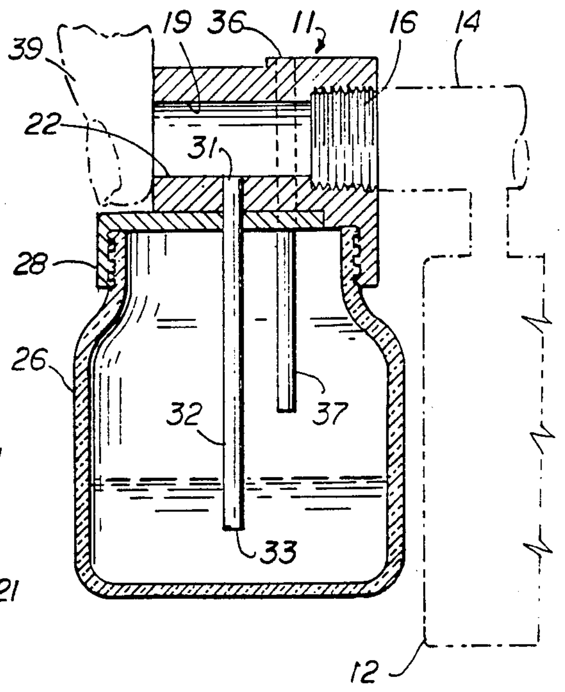
FIG. 2 is a vertical sectional view of the embodiment of FIG. 1 connected to a vacuum pump.

In FIGS. 1 and 2, the gas detector 11 is illustrated in connection with a vacuum pump 12 connected to a refrigeration system (not shown). The refrigeration system is of conventional design and has a gas such as Freon which is compressed, passed through a condenser where it is liquified, allowed to expand in heat exchanging relationship with the medium to be refrigerated, then returned to the compressor. The vacuum pump is connected to the refrigeration system to evacuate the system before it is charged with the refrigerant.

In the embodiment illustrated, exhaust from the vacuum pump is discharged through a passageway in the handle 14 of the pump, and the gas detector is connected to the handle by a threaded connection 16 at the end of the handle.

The gas detector has a body 18 in which a main passageway 19 is formed. This passageway has a threaded input port 21 which is connected to the threads on the vacuum pump handle and a discharge port 22 through which the exhaust from the pump is normally discharged.

A reservoir 26 containing a liquid 27 is threadedly connected to a threaded flange 28 on the underside of body 18. The reservoir is formed of a transparent material to permit visual observation of the liquid and any bubbling therein. Any suitable liquid can be employed in the reservoir, although a hydraulic oil is preferred in order to avoid damage to the pump in the event that some of the liquid should be drawn into the pump. The reservoir is preferably filled only about one-third full with the liquid to prevent the liquid from running out of the device in the event that the device should be tipped over or upside down.

A second passageway 31 intersects the main passageway and extends through the lower side of body 18. A tube 32 is mounted in this passageway and extends to a position below the surface of the liquid. The tube has an outlet opening 33 at its lower end.

A third passageway 36 extends between the upper and lower sides of the gas detector body. This passageway communicates with the atmosphere and with the interior of the reservoir, and it provides venting for the reservoir. A tube 37 mounted in this passageway extends to a position above the level of the liquid in the reservoir.

Means is provided for blocking the discharge side of passageway 19 to divert the exhaust from the pump through the liquid in the reservoir and out through vent opening 36. In the embodiment illustrated, discharge port 22 is positioned so that it can be blocked by the thumb or finger 39 of a person using the detector. Alternatively, a valve or other suitable means can be provided for blocking the passageway.

Operation and use of the gas detector, and therein the method of the invention, are as follows. The vacuum pump is connected to the system to be evacuated, and the gas detector is connected to the exhaust outlet of the pump. Exhaust from the pump is normally discharged through the discharge port 22 of the gas detector. To check for gas in the system, the operator places his thumb or finger over the discharge port, thereby blocking the port and causing exhaust from the pump to be diverted through passageway 31 and the liquid in the reservoir, exiting through vent opening 36. If any gas is present in the exhaust, it will produce visible bubbling in the liquid. The presence of a few bubbles indicates that the system is not fully evacuated, and a greater number of bubbles indicates a leak in the system.

Figure 3:
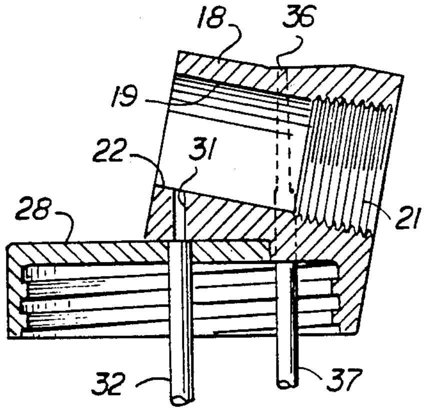
FIG. 3 is a vertical sectional view of a portion of another gas detector according to the invention.

The embodiment of FIG. 3 is generally similar to the embodiment of FIGS. 1–2, and like reference numerals designate corresponding elements in the two embodiments. In the embodiment of FIG. 3, the main passageway 19 is inclined at an upward angle on the order of 15° for use with a pump having a handle which extends at a similar angle at its distal end. In this embodiment, the bypass orifice 31 is located closer to discharge port 22 than it is in the embodiment of FIGS. 1–2, and the upper portion of the body 18 does not extend as far across the reservoir mounting flange 28. Operation and use of the embodiment of FIG. 3 is similar to that of the earlier embodiment.

In both embodiments, the gas detector can be manufactured very economically. Body 18 and reservoir 24 can be fabricated of suitable plastic materials, and they can be formed by a molding process.

The invention has a number of important features and advantages. It provides a quick and easy means for determining whether a refrigeration system or other evacuated system is fully evacuated and is not leaking. It has no moving parts and can be manufactured and installed very economically. It can be utilized with existing pumps and can readily be incorporated in new pumps.

It is apparent from the foregoing that a new and improved device and method have been provided for detecting the presence of gas in refrigeration systems and other evacuated systems. While only certain presently preferred embodiments have been described in detail, as will be apparent to those familiar with the art, certain changes and modifications can be made without departing from the scope of the invention as defined by the following claims.

I claim:

1. In a device for detecting the presence of gas in a system evacuated by a vacuum pump: a body having a main passageway with an inlet opening adapted for connection to an exhaust outlet of the vacuum pump and a discharge opening through which exhaust from the pump is normally discharged, said main passageway being of substantially the same cross-sectional dimension as the exhaust outlet of the vacuum pump, a reservoir of liquid in which bubbling can be observed, and a second passageway of substantially smaller cross-sectional dimension than the main passageway extending between the main passageway and a position in the liquid below the surface of the liquid, the discharge opening of the main passageway being adapted to be blocked manually by a person using the device to temporarily divert the exhaust from the vacuum pump through the second passageway and the liquid to produce bubbling in the liquid in the event that gas is present in the exhaust.

2. The device of claim 1 wherein the reservoir of liquid is positioned on the underside of the body, and the second passageway is formed in a tube which extends into the reservoir from the body.

3. The device of claim 1 wherein the reservoir is threadedly mounted on the body.

4. The device of claim 1 wherein the discharge opening is adapted to be blocked by placement of the person's thumb over the discharge opening.

5. In combination: a portable vacuum pump adapted to be connected temporarily to a refrigeration system for evacuating the system, said vacuum pump having an exhaust passageway through which gases removed from the system are discharged, and a gas detector having a main passageway connected to the exhaust outlet of the vacuum pump, said main passageway being of substantially the same cross-sectional dimension as the exhaust passageway of the vacuum pump and having a discharge opening through which exhaust from the pump is normally discharged, a reservoir of liquid in which bubbling can be observed, and a second passageway of substantially smaller cross-sectional dimension than the main passageway extending between the main passageway and a position in the liquid below the surface of the liquid, the discharge opening of the main passageway being adapted to be blocked manually by a person using the device to temporarily diver the exhaust from the vacuum pump through the second passageway and the liquid to produce bubbling in the liquid in the event that gas is present in the exhaust.

6. The combination of claim 5 wherein the discharge opening is adapted to be blocked by placement of the person's thumb over the discharge opening.

7. In a method of detecting the presence of gas in the exhaust of a vacuum pump, the steps of: discharging the exhaust from the pump through a main passageway of relatively large cross-sectional dimension having a discharge opening, providing communication through a relatively small passageway between the main passageway and a liquid in which bubbling can be observed, and blocking the discharge opening with the hand to temporarily diver the exhaust from the vacuum pump through the relatively small passageway into the liquid to produce bubbling in the liquid in the event that gas is present in the exhaust.

8. The method of claim 7 wherein the discharge opening is blocked by placing a thumb over the discharge opening.

* * * * *